US 008644407B2

(12) United States Patent
Qu

(10) Patent No.: US 8,644,407 B2
(45) Date of Patent: Feb. 4, 2014

(54) APPARATUS, AND ASSOCIATED METHOD OF PHASE-OFFSET MODULATION, FOR SPACE-TIME CODED WIRELESS COMMUNICATION SYSTEMS

(75) Inventor: Shouxing Qu, Ottawa (CA)

(73) Assignee: BlackBerry Limited, Waterloo (CA)

( * ) Notice: Subject to any disclaimer, the term of this patent is extended or adjusted under 35 U.S.C. 154(b) by 998 days.

(21) Appl. No.: 12/143,962

(22) Filed: Jun. 23, 2008

(65) Prior Publication Data

US 2009/0316828 A1  Dec. 24, 2009

(51) Int. Cl.
*H04B 7/02* (2006.01)

(52) U.S. Cl.
USPC ............ 375/267; 375/260; 375/259; 455/132

(58) Field of Classification Search
USPC .......................................... 375/267
See application file for complete search history.

(56) References Cited

U.S. PATENT DOCUMENTS

| | | | | |
|---|---|---|---|---|
| 5,832,044 A * | 11/1998 | Sousa et al. | | 375/347 |
| 6,882,679 B2 | 4/2005 | Somayazulu et al. | | 375/146 |
| 7,298,804 B2 * | 11/2007 | Hwang et al. | | 375/347 |
| 7,356,090 B2 * | 4/2008 | Hwang et al. | | 375/295 |
| 7,505,527 B2 * | 3/2009 | Hwang et al. | | 375/267 |
| 7,889,814 B2 * | 2/2011 | Hwang et al. | | 375/316 |
| 2002/0021683 A1 * | 2/2002 | Holtzman et al. | | 370/335 |
| 2003/0174782 A1 * | 9/2003 | Papadias et al. | | 375/295 |
| 2004/0072594 A1 * | 4/2004 | Hwang et al. | | 455/562.1 |
| 2004/0132413 A1 * | 7/2004 | Hwang et al. | | 455/73 |
| 2004/0137951 A1 * | 7/2004 | Hwang et al. | | 455/562.1 |
| 2005/0190853 A1 * | 9/2005 | Tirkkonen | | 375/295 |
| 2006/0039490 A1 * | 2/2006 | Tzannes et al. | | 375/260 |
| 2006/0056538 A1 * | 3/2006 | Nam et al. | | 375/298 |
| 2007/0230594 A1 * | 10/2007 | Mo et al. | | 375/260 |
| 2008/0260053 A1 * | 10/2008 | Yun et al. | | 375/260 |
| 2008/0291945 A1 * | 11/2008 | Luo | | 370/509 |
| 2010/0014601 A1 * | 1/2010 | Mo et al. | | 375/260 |

FOREIGN PATENT DOCUMENTS

EP          1435703 A1      7/2004

OTHER PUBLICATIONS

Su W et al: "Signal Constellations for Quasi-Orthogonal Space-Time Block Codes With Full Diversity"; IEEE Transactions on Information Theory, vol. 50, No. 10, Oct. 1, 2004, pp. 2331-2347, XP011119308.

Dung Ngoc Dao et al: "Optimal rotations for quasi-orthogonal STBC with two-dimensional constellations". Global Telecommunications Conference—GLOBECOM '05, xol. 4, Nov. 28, 2005-Dec. 2, 2005 pp. 2317-2321, XP010879519.

* cited by examiner

*Primary Examiner* — Chieh M Fan
*Assistant Examiner* — Santiago Garcia

(57) ABSTRACT

An apparatus, and an associated methodology, for facilitating communication of data in a wireless communication systems. Binary data are modulated to form modulated symbols on parallel paths. The symbols formed on one of the parallel paths are phase-offset by a phase rotator to form phase-offset symbols. The parallel paths of symbols provide the symbols, both the phase-offset symbols and the symbols that are not phase-offset, to an Alamouti encoder. As a result, the dynamic range of the transmitted RF signals is reduced due to the introduction of the phase offset between the symbols of the parallel paths applied to the Alamouti encoder.

20 Claims, 6 Drawing Sheets

APPARATUS, AND ASSOCIATED METHOD OF PHASE-OFFSET MODULATION, FOR SPACE-TIME CODED WIRELESS COMMUNICATION SYSTEMS

The present disclosure relates generally to a manner by which to reduce the dynamic range of a radio-frequency (RF) signal transmitted in digital wireless communications systems equipped with multiple antennas. More particularly, the present disclosure relates to apparatus, and an associated method, by which to apply modulated digital symbols to a space-time block encoder in a multiple-antenna transmission system.

BACKGROUND

Wireless communication systems are amongst the communication systems that have made use of advancements in digital communication technologies. A cellular communication system, for instance, is exemplary of a wireless communication system. While the early generation of wireless communication systems generally utilized analog communication techniques and provided for only limited data communication capabilities, newer-generation, wireless communication systems are exclusively using digital technologies, and increasingly provide for data-intensive communication services. As with any wireless communication system, noise, interference, signal distortions due to the limited channel bandwidth and non-linearity, time-variant multi-path propagation condition, and other impairments experienced during propagation alter the signal such that the data recovered in the receiver may differ with the corresponding data that are transmitted. This may generate errors in the recovery of the informational content of the data. And, if the impairment is too significant, the communications fail.

Significant efforts, therefore, are made to combat the impairments experienced during transmission. One promising technology in wireless communications under multi-path propagation conditions comprises the use of multiple transmit antennas and multiple receive antennas, to provide spatial diversity of propagation. To effectively exploit the spatial diversity, the digital symbols, carrying the information of data after modulation, are often encoded with space-time coding techniques before they are converted to RF signal for transmission.

In particular, space-time block coding (STBC) is one example of space-time coding techniques, for the purpose of improving the error rate performance. In a typical digital wireless communication system adopting space-time block coding, the data, which are in the form of binary bits and may have been encoded with other coding operations including error-correction coding, are digitally modulated (or equivalently, mapped) into digital symbols. Corresponding to particular values of the binary data, these digital symbols are selected, in general, from a constellation of complex values. In various existing communication systems, MPSK (M-ary Phase Shift Keying) and MQAM (M-ary Quaduature Amplitude Modulation) are widely-used, digital modulation techniques. In MPSK, where M is a power of two, each symbol takes a complex value from the constellation consisting of M points evenly distributed on a circle of unit radius. In MQAM, where M is a power of four, each symbol takes a complex value from the constellation consisting of M points evenly distributed on the grid lines of a square area with equal distance. Block by block, these symbols are then applied to a space-time block encoder. Then, the encoded symbols, after passing through pulse-shaping filters to limit the signal bandwidth, are converted to analog signals by A/D converter and then up-converted to RF signals, and then, are properly distributed to the multiple antennas for transmission.

Among various space-time block coding schemes, Alamouti coding is the simplest one applicable to a wireless communication system equipped with two transmit antennas and one or more receive antennas. With each code block of Alamouti code, the information carried by two symbols is transmitted in two time slots, and thus the coding rate is one. Another important virtue of Alamouti coding is that the optimum decoding in the receiver can be easily implemented with a simple linear detector.

In an Alamouti encoder, for each block, the encoder accepts two input symbols, and generates two sets of output symbols for transmission in two time slots, respectively, two output symbols per set for each time slot. The two output symbols transmitted in the first time slot, one from each antenna, are the same as the two input symbols. The two output symbols transmitted in the second time slot, one from each antenna, are the symbols formed by complex-conjugating the two input symbols, and then reversing the sign of one of the conjugated symbols. Moreover, after been up-converted to the RF (Radio Frequency) band, these output symbols are applied to the two transmit antennas in a manner such that each of the two input symbols, transmitted in the first time slot, and their conjugations, transmitted in the second time slot, are always transmitted from two different antennas. This is to say, for each code block, the information content carried by each symbol is transmitted twice using two time slots, once in the form of the symbol itself from one antenna, once in the form of its conjugation from another antenna.

Prior to being applied to transmit antennas, the output symbols of the Alamouti encoder are converted to analog signals and up-converted to form RF signals, and then the RF signals are amplified by power amplifiers (PA). In reality, a power amplifier is only able to amplify a signal within a limited dynamic range without, or with limited, non-linear distortion. Otherwise, if the signal amplitude varies in a dynamic range wider than the limit that the PA can handle, serious non-linear distortion results in the amplified signal. In general, the wider the signal dynamic range that a PA can handle without distortion, the more expensive the PA is. If a manner could be provided that utilizes a signal of reduced dynamic range, a less expensive PA, operable over a reduced dynamic range could instead be utilized.

It is in light of this background information related to the communication of data that the significant improvements of the present disclosure have evolved.

DETAILED DESCRIPTION

Figure 1:
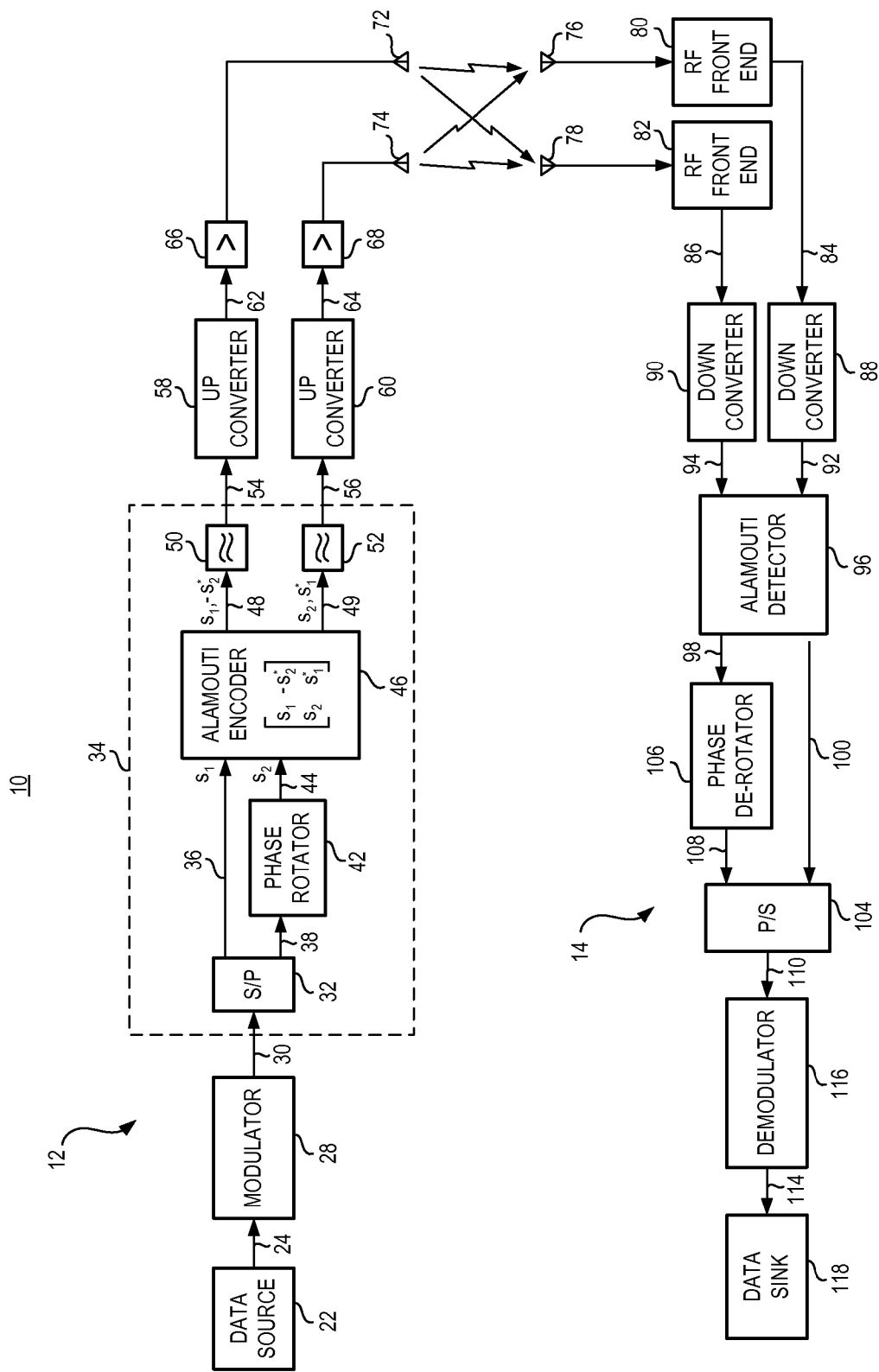
FIG. 1 illustrates a functional block diagram of a communication system that includes an embodiment of the present disclosure.

The present disclosure advantageously provides an apparatus, and an associated methodology, by which to reduce the dynamic range of the radio-frequency (RF) signal transmitted in digital wireless communications systems equipped with multiple antennas.

Through operation of an embodiment of the present disclosure, a manner is provided by which to perform Alamouti space-time block coding on the digital symbols provided by different constellations with relative phase offsets.

In one aspect of the present disclosure, the resultant RF signal is formed that is of reduced dynamic range. Circuit elements, such as the transmitter power amplifiers, that operate upon the signals of coded symbols correspondingly need only to be of reduced dynamic range. A power amplifier that is required merely to exhibit characteristics that attain the reduced dynamic range, is more economically implemented than a power amplifier that is required to exhibit a larger dynamic range. And, non-linear distortion in the resultant signals is lessened as the reduced dynamic range of the signals input to the power amplifier are less likely to be beyond the linear operational range of the power amplifier.

In another aspect of the present disclosure, the data that is to be communicated is mapped to symbols by digital modulation. Serially-provided symbols are converted, such as by way of a serial to parallel converter, into symbols provided on parallel application paths. For instance, a single, serial sequence of input symbols is converted into a pair of symbol sequences provided upon parallel paths.

In another aspect of the present disclosure, the data symbols, applied on the parallel paths, are provided to an Alamouti encoder. The symbols applied to the encoder are taken from different constellation sets, such as constellation sets that are phase-offset from one another. By offsetting the phases of the constellation sets, viz., the symbols of each code block thereof, provided to the encoder on the separate lines never belong to the same constellation.

In another aspect of the present disclosure, the encoder operates to encode the input symbols in a manner to provide spatial diversity gain. The Alamouti coding is applicable to the systems equipped with two transmit antennas and one or more receive antennas. In an exemplary Alamouti coding scheme, for each coding block, the coding of an input pair of symbols forms a (2×2) code matrix of two rows and two columns. The first column consists of the pair of the input symbols. The second column consists of the complex conjugated version of the first column with a row exchange. In addition, the sign of one of the two conjugated symbols is reversed. The symbols on the first row will be transmitted by the first transmit antenna, and the symbols on the second row will be transmitted by the second transmit antenna. On the other hand, from each transmit antenna, the symbols on the same row but different columns are transmitted successively in the order of columns.

In another aspect of the present disclosure, a phase rotator is provided with input symbols applied on one of the parallel lines onto which the input symbols are applied. The phase rotator rotates the phase of the input symbols applied thereto by a pre-determined amount. Thereby, the symbols, once phase-rotated, are of symbols of a constellation set that differs with the constellation set of the symbols on the other parallel application path. Phase-offset modulation is provided thereby.

In another aspect of the present disclosure, when received at a receive station, the received signal is provided to an Alamouti detector that makes decisions on the transmitted symbols based on the received signals, and provides, on a set of decoded symbol paths, the decoded symbols. A phase de-rotator is utilized to de-rotate the decoded symbol values applied on one of the paths which has been phase rotated in the transmitter with the same rotation amount. Once de-rotated, the decoded symbols provided by the phase de-rotator are provided to a parallel to serial converter along with symbol values provided on other paths. The parallel-to-serial converter forms a single serial sequence of symbols that forms the recovered symbol sequence. The recovered symbol sequence is then de-mapped into the recovered sequence of bits.

The introduction of phase rotation between the two symbol constellations in the transmitter and the de-rotation operation in the receiver does not affect the diversity provided by the space-time block coding, does not change the signal power spectrum, and does not change other system performance, while the resultant signal dynamic range is reduced, as shown below.

In these and other aspects, an apparatus and associated method, is provided for a communication station that communicates symbols. A symbol provider is configured to provide symbols block by block. Two symbols are provided for each block. An encoder is adapted to encode these symbols block by block according to the Alamouti coding rule.

Referring first, therefore, to FIG. 1, an exemplary communication system, shown generally at 10, provides for communications between a set of communication stations. Here, the communication system is shown to include a communication station 12 and a communication station 14. The following description shall describe exemplary implementation in which the communication system 10 forms a cellular radio communication system. The communication station 12 is, in the exemplary implementation, representative of a cellular mobile station, and the communication station 14 is representative of a network station, such as a Base Transceiver Station (BTS). For purposes of explanation, only the transmit part of the communication station 12 and the receive part of the communication station 14 are shown in the figure. As the mobile and network stations of a cellular communication system are generally two-way wireless transceivers, the receive part of the communication station 14 is also representative of the receive part of a mobile station, and the transmit part of the communication station 12 is also representative of the transmit part of the network station. More generally, the communication system is representative of any of various Multiple Input, Multiple Output (MIMO) communication systems having multiple system inputs and multiple system outputs and adopting space-time block coding. And, while the exemplary system shows a two-input, two-output scheme, the disclosure set forth herein is more generally applicable to a system having any number of outputs which uses Alamouti coding as a part or multiple parts.

The communication stations 12 and 14 are functionally represented, implemented in any desired manner, including algorithms executable by processing circuitry, hardware elements, or combinations thereof. And, the functions carried out by the various elements need not be co-located at a single entity and, in various implementations, are distributed across more than one physical entity.

The data that is communicated by the communication station 12 is sourced at a data source 22. The data comprises, for instance, voice data, multimedia data, textual data, or any other data amenable for communication pursuant to operation of the communication system. The data here comprises binary data, formatted in a desired manner, such as in frames or packets of data, and may have been coded with any binary coding schemes, including but not limited to, the error-correcting coding. A serial stream of binary bits is provided, here indicated by way of the line 24 to a modulator 28. The modulator operates to use the bits of the data that are applied thereto and to form modulated symbols representative of the data bits. The symbols are also generated on a serial path 30 that here is provided to a serial to parallel converter (S/P), e.g. a de-multiplexer, 32 of an apparatus 34 of an embodiment of the present disclosure. The converter 32 converts the serial sequence of symbols into parallel sequences on the paths 36 and 38. The exemplary implementation forms a single-to-dual converter that forms two streams of symbols on the lines 36 and 38. (In other implementations for more general cases with more than two transmit antennas, other numbers of symbol streams are formed.) The path 38 extends to a phase rotator 42 while the path 36 extends directly to an encoder 46. The phase rotator 42 operates to rotate the phase of each symbol applied thereto on the path 38. And, phase-rotated symbols are provided on the path 44 to the encoder 46. The amount of phase rotation introduced by the phase rotator 42 upon the symbols applied thereto is a predetermined amount, such that the two constellations do not share any symbol points. For instance, for the MPSK modulation, it can be, but not limited to, $\pi/M$ radians. For the QAM modulation, it can be, but is not limited to, $\pi/4$ radians. The converter 32 and rotator 42 thereby comprise a symbol provider that provide symbols on the lines 36 and 44 that are of separate, i.e., first and second symbol sets.

In the exemplary implementation, the encoder 46 forms an Alamouti encoder that operates to encode the symbols provided thereto on the lines 36 and 44. Each pair of symbols applied to the encoder is defined to form an input symbol matrix for a code block. And, the encoder generates a code matrix comprising coded representations of the input symbols. In the exemplary implementation, the coding comprises generating a 2×2 (i.e. a two row and two column) symbol matrix for every two input symbols in the form of a 2×1 (i.e. a two row and one column) symbol matrix, by taking the 2×1 input symbol matrix as the first column, and its complex conjugate with a row exchange as the second column. Moreover, the sign of either the first or the second conjugated value in the second column then is reversed. In this way the two columns of the generated 2×2 matrix are orthogonal mathematically.

Coded symbols of the separate rows are provided on separate paths, here the paths 48 and 49, respectively. On the other hand, to each of the paths 48 and 49, the coded symbols of the two columns are provided sequentially in the order of the columns. Here, the paths 48 and 49 are extended to the separate pulse-shaping filters 50 and 52, respectively, to confine the signal bandwidth. These pulse-shaping filters may be implemented by, but not limited to, the well-known square-root raised cosine filters. The outputs from the two filters are provided on the lines 54 and 56 to up converters 58 and 60. Up-converted outputs are provided on the lines 62 and 64 to power amplifiers 66 and 68. And, the amplified outputs are provided to separate antennas 72 and 74.

Due to the phase rotations of the symbols provided on the path 38 and the Alamouti encoding rule, the symbols corresponding to the signals transmitted from each of the antennas 72 and 74 alternately belong to the two different constellations with a phase offset each another, and therefore the transition from one symbol to the next symbol from time to time does not pass the zero. This results in reduced signal dynamic ranges relative to the dynamic ranges of signals that would otherwise be transmitted without the use of the phase rotator. Circuit elements in the transmit chain that operate upon the coded symbols, such as power amplifier, and related, elements (not shown in FIG. 1) correspondingly are able to be operated at the reduced dynamic range, permitting circuit elements to be selected that exhibit operating characteristics over the lesser dynamic range. Cost savings result. And, the signal dynamic ranges are less likely to be beyond the linear operational range of the power amplifier. Less non-linear distortion in the resultant, amplified signals occurs.

The communication station 14 includes a set of antennas, here two antennas 76 and 78 are assumed as shown that receive signal energy and convert the received signal energy into electrical form. It should be known that this disclosure is applicable regardless of the number of receive antennas. RF (Radio Frequency) operations are performed by the elements 80 and 82 that extend, by way of the lines 84 and 86 to down converters 88 and 90 and upon the received signal, and the base-band representations of the received signal are provided by way of the lines 92 and 94 to the Alamouti detector 96. The detector 96 performs the normal operation of the linear detector for Alamouti decoding. A set of decoded symbols are provided on separate paths, here the paths 98 and 100. The path 100 extends directly to a parallel to serial converter 104 while the path 98 extends to a phase de-rotator 106. The phase de-rotator operates to de-rotate in phase each decoded symbol provided thereto. The de-rotated symbols are provided by way of the line 108 to the parallel to serial converter 104. The parallel to serial converter, a dual-to-serial converter in the exemplary implementation, generates a serial sequence of symbols on the line 114. The line 114 extends to a demodulator 116 that de-maps the symbols to provide the recovered binary bits thereafter to a data sink 118.

Figure 2:
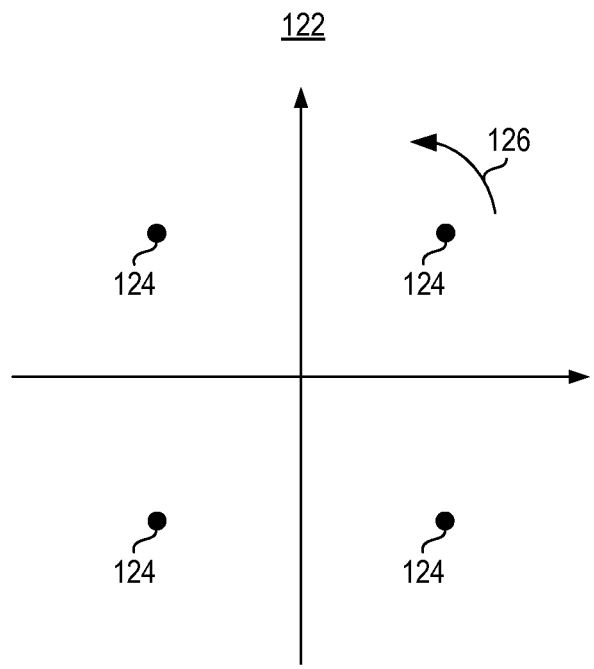
FIG. 2 illustrates a representation of an exemplary constellation whose symbols are utilized during operation of an exemplary implementation of an embodiment of the present disclosure.

Turning next to FIG. 2, a representation shown generally at 122, illustrates a constellation of 4QAM, which consists of four constellation points, i.e., symbols 124. The constellation set shown in FIG. 2 is exemplary of a constellation set from which symbols are selected to represent binary bits. That is to say, for instance, the modulator 28 shown in FIG. 1 maps every two binary bits to form a symbol, in one implementation, represented by one of the four points 124 of the constellation set shown in FIG. 2. Modulated symbols formed on the paths 36 and 38 of the communication station 12 shown in FIG. 1 are of values of the symbols 124. The arrow 126 shown in FIG. 2 is representative of exemplary rotation of the constellation 122, as shall be noted with respect to the description of FIG. 3 below.

Figure 3:
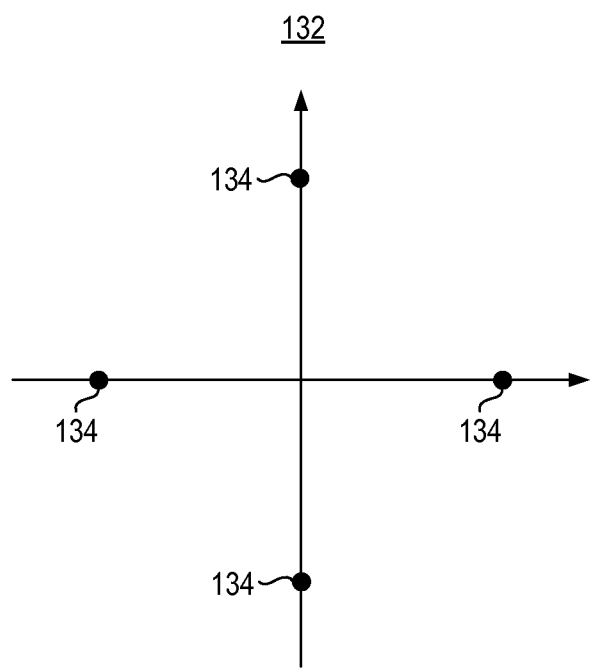
FIG. 3 illustrates a representation, similar to that shown in FIG. 2, but of a constellation having symbols phase-rotated relative to those shown in FIG. 2.

FIG. 3 illustrates a representation 132 that illustrates another constellation set of 4QAM which also consists of four constellation points, that is, symbols 134. The symbols 134 correspond to the symbols 124 shown in FIG. 2 but are offset by a 45° phase rotation. The symbols 134 are representative, for instance, of symbols of values formed on the path 44 by the phase rotator 42 of the communication station 12 shown in FIG. 1. Comparison of the representations 122 and 132 of FIGS. 2 and 3 illustrate a 45° offset there between. The 45° offset of the constellations permits the dynamic range of signals provided to the power amplifiers 66 and 68 of the communication station 12 shown in FIG. 1 to be of reduced dynamic ranges due to the symbols alternately taken from the different constellations with the phase offset applied thereto in sequence.

Figure 4:
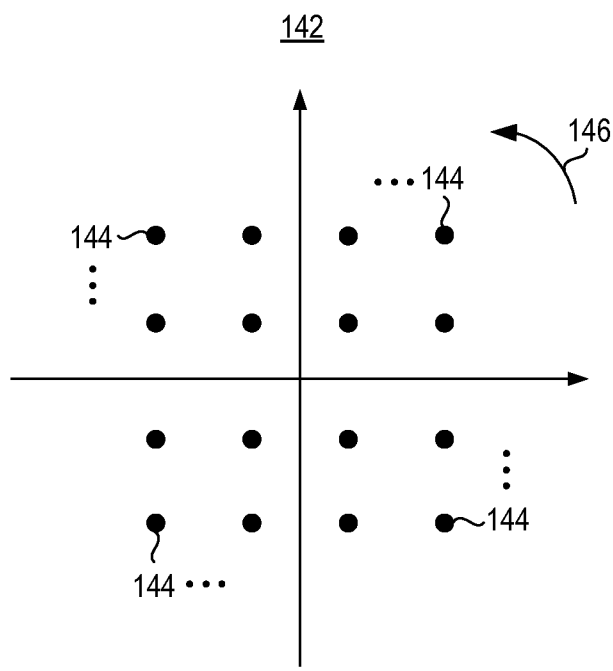
FIG. 4 illustrates a representation of another exemplary constellation whose symbols are utilized during operation of an exemplary implementation of the present disclosure.

FIG. 4 illustrates a representation 142 that illustrates a constellation of a 16-QAM (Quadrature Amplitude Modulation) symbol set. Here, 16 symbols 144 form the constellation. The arrow 146 is representative of exemplary rotation of the constellation 142.

Figure 5:
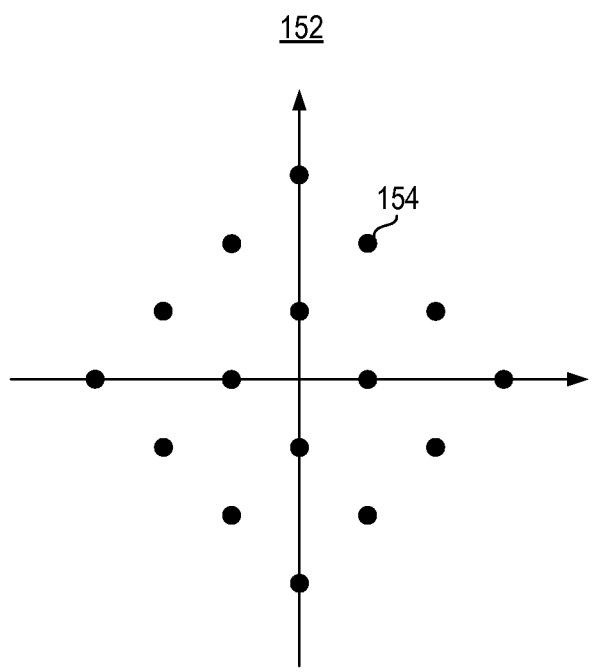
FIG. 5 illustrates a representation, similar to that shown in FIG. 4, but of a constellation having symbols phase-rotated relative to those shown in FIG. 4.

FIG. 5 illustrates a representation 152 of another 16-QAM constellation having symbols 154. The constellation is rotated by 45° relative to the constellation shown in the representation 142 of FIG. 4.

The symbols 144 of the representation 142 are exemplary, for instance, of symbols into which input binary bits are mapped by the modulator 28 shown in FIG. 1 and of symbols that are generated on the paths 36 and 38, also shown in FIG. 1. The symbols 154 of the representation 152 are exemplary, for instance, of the values of phase-rotated symbols formed on the path 44 by the phase rotator of the communication station 12 shown in FIG. 1.

Figure 6:
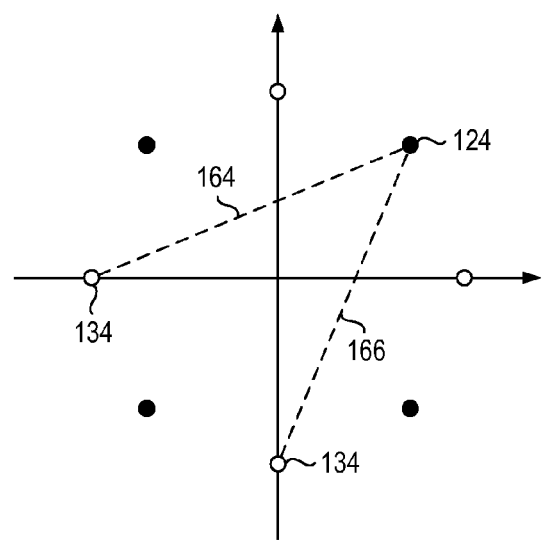
FIG. 6 illustrates representations of possible signal transitions with Alamouti coding when using a pair of signal constellations, offset form one another, as shown with respect to the constellation sets shown in FIGS. 2 and 3, under bandwidth unlimited condition.

FIG. 6 illustrates a representation of exemplary symbol-value transitions using 4QAM modulation scheme, such as that shown with respect to FIGS. 2-3 implemented at the apparatus 34 shown in FIG. 1. Here, the symbols 124 and 134 are again shown. And, the transitions 164 and 166 represent two possible transitions of symbol values between adjacent symbols on each of the lines 48 and 49 shown in FIG. 1. Without the phase offset, the possible transitions between successive symbols might pass the zero. However, through use of the symbols alternately belonging to different constellations with phase offset each other the transition never passes the zero. This greatly reduces the dynamic ranges of the signals thereafter, including those applied to the power amplifiers.

Figure 7:
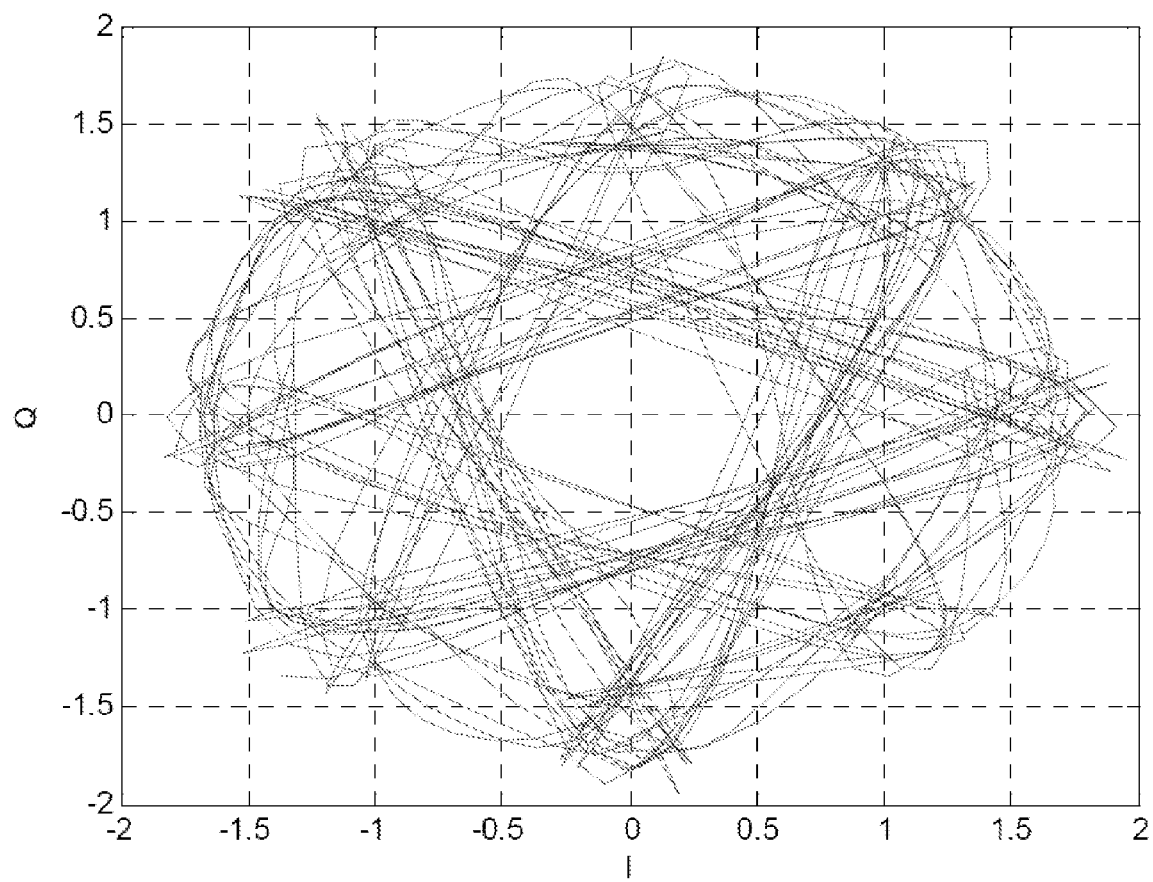
FIG. 7 illustrates a representation of exemplary trajectories of the signal with Alamouti coding and using a pair of signal constellations, offset form one another, as shown with respect to the constellation sets shown in FIGS. 2 and 3, with bandwidth-limited pulse shaping.

FIG. 7 illustrates a representation shown at the line 54 of FIG. 1 representative of exemplary trajectories obtained through simulation of an Alamouti code signal modulated with 4QAM in which the constellation phase offset is utilized. The simulation utilizes a square-root raised cosine filter, of a roll-off equal to 0.5, for the pulse-shaping filter 50 shown in FIG. 1. An analysis of the representation indicates that the probability for the signal magnitude is close to zero is much lower than otherwise if the constellation phase offset is not applied.

Figure 8:
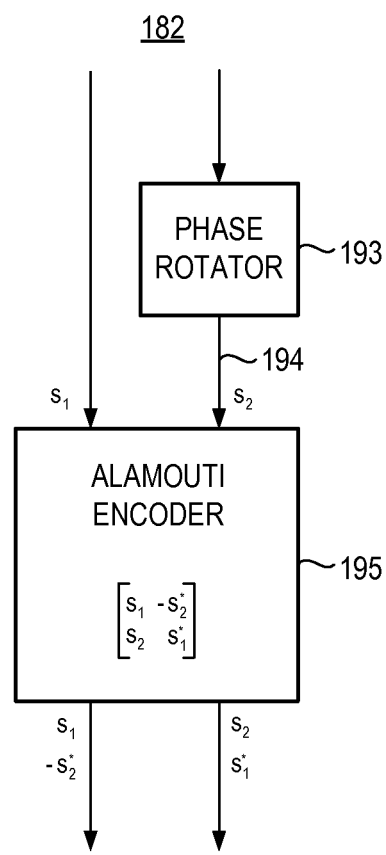
FIG. 8 illustrates a flow diagram representative of the method of operation of an embodiment of the present disclosure.

FIG. 8 illustrates a method flow diagram, shown generally at 182, representative of the method of operation of an embodiment of the present disclosure. The method facilitates communication of symbols by a wireless communication station that communicates symbols.

FIG. 8 shows exemplary implementation of a method of an embodiment of the present disclosure. As shown in FIG. 8, two streams of input symbols come from the lines 190 and 192. These two streams of symbols may be provided by a serial-to-parallel converter to split from a common symbol source, or initially generated by two separate resources. The symbol stream on the line 192 is phase rotated at 193 and a symbol stream is formed on the line 194. The lines 190 and 194 apply symbol streams to the encoder 195 and the encoded symbol streams are formed on the lines 196 and 198.

Figure 9:
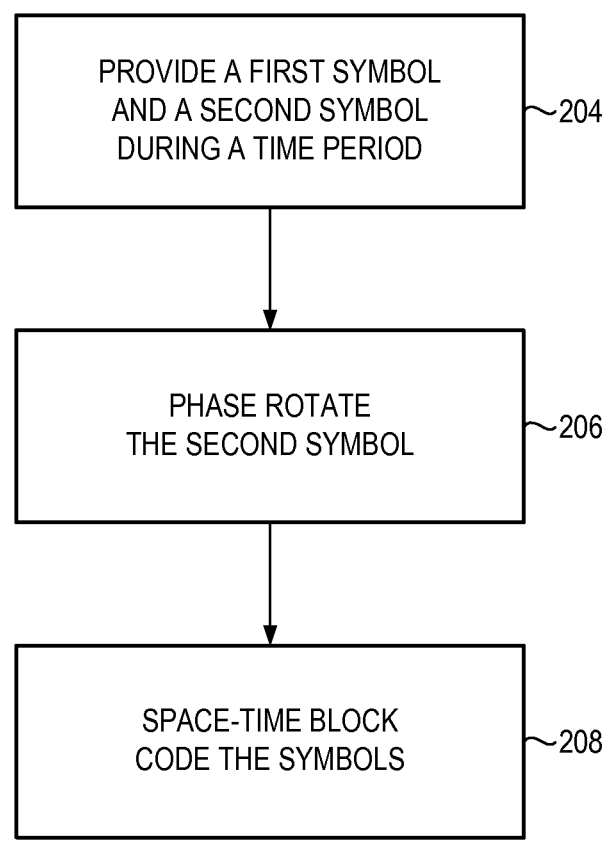
FIG. 9 illustrates a method flow diagram representative of the method of operation of an embodiment of the present disclosure.

FIG. 9 illustrates a method flow diagram, shown generally at 202, representative of the method of operation of an embodiment of the present invention. The method facilitates communication of data symbols by a communication station that communicates data symbols.

First, and as indicated by the block 204, a first symbol and a second symbol are provided during at least a first symbol time period. The first symbol is of a first symbol set, and the second symbol is of a second symbol set.

Then, and as indicated by the block 206, the second symbol is phase-rotated. And, as indicated by the block 208, the first symbol and the second symbol are space-time block coded.

Through operation of an embodiment of the present disclosure, the symbols that are to be communicated are space-time coded with Alamouti coding, and the resultant coded symbols are of a reduced dynamic range.

Presently preferred embodiments of the disclosure and many of its improvements and advantages have been described with a degree of particularity. The description is of preferred examples of implementing the disclosure, and the description of preferred examples is not necessarily intended to limit the scope of the disclosure. The scope of the disclosure is defined by the following claims.

What is claimed is:

1. An apparatus for a wireless communication station that communicates symbols, said apparatus comprising:
    a symbol provider configured to provide a first symbol and a second symbol during at least a first symbol time period, the second symbol created with a phase-offset relative to the first symbol, the first symbol being a member of a first symbol set and the second symbol being a member of a second symbol set, the first symbol set and the second symbol set being from different constellations that are phase-offset from each other;
    an encoder adapted to receive the first symbol and the second symbol provided by said symbol provider as input symbols and encode the first symbol and the second symbol as a code block, wherein each of the input symbols of the code block are from a different constellation, said encoder configured to space-time block code the first symbol and the second symbol and wherein successive encoded symbols provided by said encoder are alternately taken from the different constellations, such that phase-offset between the successive encoded symbols are of a reduced dynamic range.

2. The apparatus of claim 1 further comprising a phase rotator configured to phase rotate symbols of the second symbol set relative to symbols of the first symbol set.

3. The apparatus of claim 1 wherein the first symbol set comprises an MPSK, M-ary Phase Shift Keying, symbol set.

4. The apparatus of claim 1 wherein the first symbol set comprises an M-ary QAM, Quadrature Amplitude Modulation, symbol set.

5. The apparatus of claim 4 wherein the second symbol set is offset from the first symbol set by $n\pi/M$ radians wherein n is an odd integer when an MPSK modulation scheme is used.

6. The apparatus of claim 4 wherein the second symbol set is offset from the first symbol set by $\pi/4$ radians when an MQAM modulation scheme is used.

7. The apparatus of claim 1 wherein the communication station comprises a transmit diversity communication station having a first transmit antenna and a second transmit antenna and wherein said encoder is configured to provide space-time block coded representations of the first and second symbols, respectively, to the first and second transmit antennas.

8. The apparatus of claim 1 wherein said encoder comprises an Alamouti encoder.

9. The apparatus of claim 1 wherein said encoder is configured to negate a component part of the first symbol and to negate a component part of the second symbol, and wherein said encoder is configured to form a space-time-encoded block comprising the first symbol, the first symbol with the component part thereof negated, the second symbol, and the second symbol with the component part thereof negated.

10. The apparatus of claim 1 wherein the communication station comprises a first transmit antenna and a second transmit antenna, wherein data symbols applied to the first transmit antenna are alternately of the first symbol set and of the second symbol set, and wherein data symbols applied to the second transmit antenna are alternately of the first symbol set and of the second symbol set.

11. The apparatus of claim 1 wherein said symbol provider is configured to provide a successive series of first symbols and a successive series of second symbols during successive time periods.

12. A method for communicating symbols by a communication station that communicates symbols, said method comprising:
providing a first symbol during at least a first symbol time period;
providing a second symbol during the at least a first symbol time period, the second symbol being phase offset relative to the first symbol, the first symbol being a member of a first symbol set and the second symbol being a member of a second symbol set, and, the first symbol set and the second symbol set being from different constellations that are phased-offset from each other; and,
receiving the first symbol and the second symbol, and space-time block coding the first symbol and the second symbol as input symbols to a code block, wherein each of the input symbols of the code block are from a different constellation and wherein successive coding input symbols form successive encoded symbols that are alternately taken from the different constellations such that phase-offset between the successive symbols are of a reduced signal dynamic range.

13. The method of claim 12 wherein said space-time block coding comprises coding using an Alamouti encoding technique.

14. The method of claim 12 wherein said phase offsetting further comprises phase rotating the first symbol.

15. The method of claim 12 wherein the second symbol set is comprised of symbols offset in phase from symbols of the first symbol set.

16. An apparatus for a communication station that receives a space time coded block of symbols, said apparatus comprising:
a decoder having decoder outputs and adapted to receive the space time coded block of symbols wherein successive coded symbols are alternately taken from different constellations such that phase-offset between the successive coded symbols are of a reduced signal dynamic range, said decoder configured to decode the space time coded block of symbols to form first decoded symbols and second decoded symbols on the decoder outputs during successive time periods, each of the decoded symbols on each of the decoder outputs being from the different constellations that are phase-offset from each other, the second decoded symbols having a phase-offset of the first decoded symbols, the first decoded symbols being members of a first symbol set and the second decoded symbols being members of a second symbol set, the first symbol set and the second symbol set being from the different constellations; and
a converter adapted to receive the first decoded symbols and the second decoded symbols in parallel streams, said converter configured to convert the first and second decoded symbols, respectively, into one series symbol sequence of a single symbol set.

17. A method for operating upon a space time coded block of symbols received at a communication station, said method comprising:
decoding the space time coded block of symbols wherein successive coded symbols are alternately taken from different constellations such that phase-offset between the successive coded symbols are of a reduced signal dynamic range to form parallel sequences of decoded symbols during successive time periods, each of the decoded symbols in the parallel sequences being from different constellations, and including first decoded symbols and second decoded symbols in the parallel sequences of first and second symbols, the second decoded symbols having a phase-offset of the first decoded symbols, the first decoded symbols being members of a first symbol set and the second decoded symbols being members of a second symbol set, the first symbol set and the second symbol set each being from the different constellations; and
converting the parallel sequences of first and second symbols, respectively, into one series symbol sequence of a single symbol set.

18. The method of claim 17 wherein converting further comprises a dual-to-serial converting.

19. The method of claim 16 wherein the converter further comprises a dual-to-serial converter.

20. A transmitter having an improved dynamic range performance in a wireless communication station that communicates symbols, comprising:
a serial to parallel converter that accepts a serial sequence of symbols and provides two parallel streams of first symbols;
a phase rotator that accepts a first of the two parallel streams of symbols and phase rotates the symbols to produce a stream of second symbols, the first symbols being members of a first symbol set and the second symbols being members of a second symbol set, the first symbol set and the second symbol set being from different constellations that are phase-offset from each other; and,
an encoder adapted to receive a first symbol from a second of the two parallel streams of first symbols and a second symbol from the stream of second symbols as input symbols to code blocks wherein each of the input symbols of each code block are from a different constellation, said encoder further adapted to couple the first symbol to a first antenna and to couple the second symbol to a second antenna during a first symbol time period and to couple a complex conjugate of the second symbol to the first antenna and to couple a complex conjugate of the first symbol to the second antenna during a second symbol time period, one of the complex conjugate of the of the second symbol and the complex conjugate of the first symbol being made negative, such that successive encoded symbols provided by said encoder are alternately taken from the different constellations such that phase-offset between the successive encoded symbols are of reduced signal dynamic range.

* * * * *